US007846395B2

(12) United States Patent
Shaw

(10) Patent No.: US 7,846,395 B2
(45) Date of Patent: Dec. 7, 2010

(54) CONTAINER CLOSURE AND DEVICE TO INSTALL AND REMOVE CLOSURE

(75) Inventor: James D. Shaw, Rochester, NY (US)

(73) Assignee: Ortho-Clinical Diagnostics, Inc., Rochester, NY (US)

( * ) Notice: Subject to any disclaimer, the term of this patent is extended or adjusted under 35 U.S.C. 154(b) by 1354 days.

(21) Appl. No.: 10/621,430

(22) Filed: Jul. 16, 2003

(65) Prior Publication Data

US 2005/0013742 A1 Jan. 20, 2005

(51) Int. Cl.
*G01N 35/00* (2006.01)
*B67B 7/18* (2006.01)

(52) U.S. Cl. ......................... 422/102; 422/99; 422/104; 422/63; 422/64; 436/43; 436/174; 436/183; 81/3.07; 81/3.08; 81/3.33; 81/3.45; 81/3.2; 215/329; 215/295; 215/356; 220/260

(58) Field of Classification Search .................. 422/99, 422/102; 604/192; 215/316, 318
See application file for complete search history.

(56) References Cited

U.S. PATENT DOCUMENTS 3,556,332 A * 1/1971 Libit .......................... 215/213
3,950,917 A 4/1976 Choksi et al.
5,145,646 A 9/1992 Tyranski
5,230,865 A * 7/1993 Hargett et al. ............... 422/102
5,533,407 A 7/1996 Besnier
5,540,890 A 7/1996 Clark et al.
5,582,222 A 12/1996 Riall
5,846,489 A * 12/1998 Bienhaus et al. .............. 422/63
6,216,340 B1 * 4/2001 Fassbind et al. ............... 29/773
6,258,078 B1 * 7/2001 Thilly ........................ 604/411
6,281,008 B1 8/2001 Komai et al.
6,375,898 B1 4/2002 Ulrich
6,394,983 B1 * 5/2002 Mayoral et al. ............. 604/192
6,426,049 B1 * 7/2002 Rosen et al. ................ 422/102
6,651,305 B2 11/2003 Fassbind et al.

(Continued)

FOREIGN PATENT DOCUMENTS

EP 0 383 564 8/1990

(Continued)

OTHER PUBLICATIONS

Partial European Search Report, dated Nov. 2, 2004, for European Appln. No. EP 04 25 4265.

*Primary Examiner*—P. Kathryn Wright
(74) *Attorney, Agent, or Firm*—Todd J. Burns

(57) ABSTRACT

A closure for a container includes: (a) an inner cylindrical wall having first and second ends and defining a space; (b) an outer cylindrical wall opposite the inner cylindrical wall and having the first and second ends to form an outer surface of the closure; (c) a first end wall extending across said first end, wherein the first end wall comprises a recess extending a least partially into the space, and a first set of threads disposed on the recess. An apparatus usable on a diagnostic analyzer container and includes: a threaded rotatable spindle adapted for threading into a closure having a threaded depression and for applying a rotational force to remove the closure; and a clutch having an element adapted to engage the closure and apply a rotational to the closure.

39 Claims, 7 Drawing Sheets

U.S. PATENT DOCUMENTS

| | | | | |
|---|---|---|---|---|
| 2001/0000793 | A1* | 5/2001 | Daubert et al. | 604/200 |
| 2001/0013169 | A1* | 8/2001 | Fassbind et al. | 29/773 |
| 2004/0241864 | A1* | 12/2004 | Sattler et al. | 436/43 |

FOREIGN PATENT DOCUMENTS

| | | |
|---|---|---|
| EP | 0536 460 A1 | 10/1991 |
| EP | 0 907 083 | 4/1999 |
| EP | 1 066 882 | 1/2001 |
| GB | 2 118 155 | 10/1983 |

* cited by examiner

CONTAINER CLOSURE AND DEVICE TO INSTALL AND REMOVE CLOSURE

BACKGROUND OF THE INVENTION

1. Field of the Invention

The present invention relates to a container closure and a device to install and remove the closure, particularly for a reagent in a clinical analyzer. In particular, the present invention relates to a bottle closure having reverse threads and a device having a reverse threaded spindle to remove the bottle closure.

2. Description of the Related Art

Clinical analyzers are known in the art. The VITROS® 250, 950 and 5,1 FS are analyzers manufactured by Ortho-Clinical Diagnostics Corp. In analyzers, particularly automated analyzers, reagents are generally packaged in plastic bottles, capped and stored in refrigerated conditions. As long as the reagents are capped and refrigerated, they perform within specifications after many months of storage. Some reagent capping designs include passive seals such as so-called “duck bill” seals. However, passive designs are often inadequate because they are incapable of maintaining the internal pressure that builds up in a reagent container.

Other seals include conventional screw caps and other active sealing approaches, such as sliding closures described in U.S. Pat. No. 5,582,222. See also, U.S. Pat. Nos. 3,950,917 and 5,145,646. However, all of these designs require relatively complex capping and uncapping devices. Additionally, sliding closures, used on reagent containers of some diagnostic systems are complex, costly, occupy valuable space in the reagent supply rotor, and often require the operator to perform extra steps to load the reagent into a reagent supply.

Another design that has been considered by the present inventors is to remove the caps from the reagent bottles initially and then store the open reagent containers under controlled humidity and temperature to inhibit evaporation. In spite of these conditions, the inventors found that several reagents degraded rapidly. Subsequent investigation showed that these reagents needed to be stored in a container with a seal that would withstand positive internal pressure in order to avoid degradation.

SUMMARY OF THE INVENTION

Upon further investigation, the present inventors have found that what was needed is a container or bottle closure and an apparatus that interacts with a reagent supply to:

1) remove the closure from the reagent bottle;

2) allow the analyzer’s metering system access to the fluid reagent;

3) replace the same closure on the bottle with sufficient resistance to positive internal pressure to ensure that the reagents are adequately maintained.

In addition the inventors found that:

1) the apparatus needs to operate reliably over several hundreds of cycles for each bottle, maintaining consistent sealing, and millions of cycles over the life of the analyzer;

2) the closure must be installed during the reagent bottling process and not require removal, loosening or any extra user actions during reagent loading; and 3) the closure should have minimal increase on unit manufacturing cost compared to conventional screw caps.

One object of the invention is to overcome the disadvantages of the known art described above and to achieve one or more of the objectives described above.

The foregoing and further objects of the invention are accomplished according to one aspect of the invention that provides a closure for a container that includes (a) an inner cylindrical wall having first and second ends and defining a space; (b) an outer cylindrical wall opposite the inner cylindrical wall and having said first and second ends to form an outer surface of the closure; (c) a first end wall extending across said first end, wherein said first end wall comprises a recess extending a least partially into said space, and a first set of threads disposed on said recess. In a preferred embodiment, a second set of threads is disposed on said inner or outer cylindrical wall having a direction which is opposite that of the first set of threads.

According to another aspect of the invention, there has been provided a combination container and a closure comprising the closure as described above and a container having an opening at one end adapted to receive the closure.

According to another aspect of the invention, there has been provided an apparatus for removing and installing a closure on a container that includes: a threaded rotatable spindle adapted for threading into a closure having a threaded depression and for applying a rotational force to remove the closure; and a clutch having an element adapted to engage the closure and apply a rotational to the closure.

Still another aspect of the invention provides a method for removing a closure on a container that includes: providing a closure described above arranged on a container; providing a rotatable threaded spindle; bringing the rotatable threaded spindle into proximity with the recess on the first end wall; screwing the threaded spindle into the first set of threads on the recess; and moving the threaded spindle having the closure threaded thereon away from the container, thereby removing the closure from the container.

Yet another aspect of the invention provides a method for installing a closure on a container that includes: providing a closure described above; providing a rotatable threaded spindle having the closure screwed thereon, wherein the weight of the closure and the engagement of the threaded spindle with the threaded recess is sufficient to unscrew the closure from the threaded spindle when the closure is not supported on the container; providing a clutch having an element adapted to engage the closure and apply a rotational force to the closure; engaging the element with the closure to prevent the spindle from being unscrewed from the closure; moving the threaded spindle having the closure screwed thereon into proximity with an opening on the container; and rotating the spindle and clutch in a direction to unthread the spindle from the closure.

Still another aspect of the invention provides an analyzer that includes: a metering probe capable of dispensing or aspirating a liquid; an incubator; a measurement system for measuring a parameter of a sample; a combination container for containing a reagent and a closure comprising the closure as described above and a container having an opening at one end and adapted to receive the closure; and an apparatus for removing and installing the closure on the reagent container comprising: a threaded rotatable spindle adapted for threading into a closure having a threaded recess and for applying a rotational force to remove the closure; and a clutch having an element adapted to engage the closure and apply a rotational force to the closure.

Further objects, features and advantages of the present invention will be apparent to those skilled in the art from detailed consideration of the preferred embodiments that follow.

DETAILED DESCRIPTION OF PREFERRED EMBODIMENTS

One aspect of the present invention allows for simplified removal and installation of closures on a container. The closure, container and apparatus can be used on any system that requires a container having a closure that can be repeatedly removed and installed. While the present invention can be used in any environment, the description below will be in connection with a clinical analyzer, understanding that such description does not limit the present invention. In a further preferred embodiment, the present invention is used in conjunction with an in vitro analyzer for use in human and animal diagnostics, such as the VITROS® 250, 950 or 5,1 FS series of analyzers made by Ortho-Clinical Diagnostics, Inc.

One aspect of the invention provides a closure for a container that provides the advantage of simplified removal and installation. The closure can be used by itself or with the apparatus described more fully below. The closure (alternatively referred to as a cap) can be used on a container such as a bottle, for containing a liquid or other fluent material, such as a powder. In a preferred embodiment, the closure and container are cylindrical. The top of the closure (also called the first end wall) has a depression or recess that extends into the interior space of the closure and which is internally threaded to receive the threads of a rotatable spindle described in detail below. Preferably the recess is cylindrical and concentric with the outside diameter of the cap. The bottom of the depression or recess (also called the second end wall) is preferably at least partially blocked or closed to stop advancement of the spindle during the removal method.

Figure 1A:
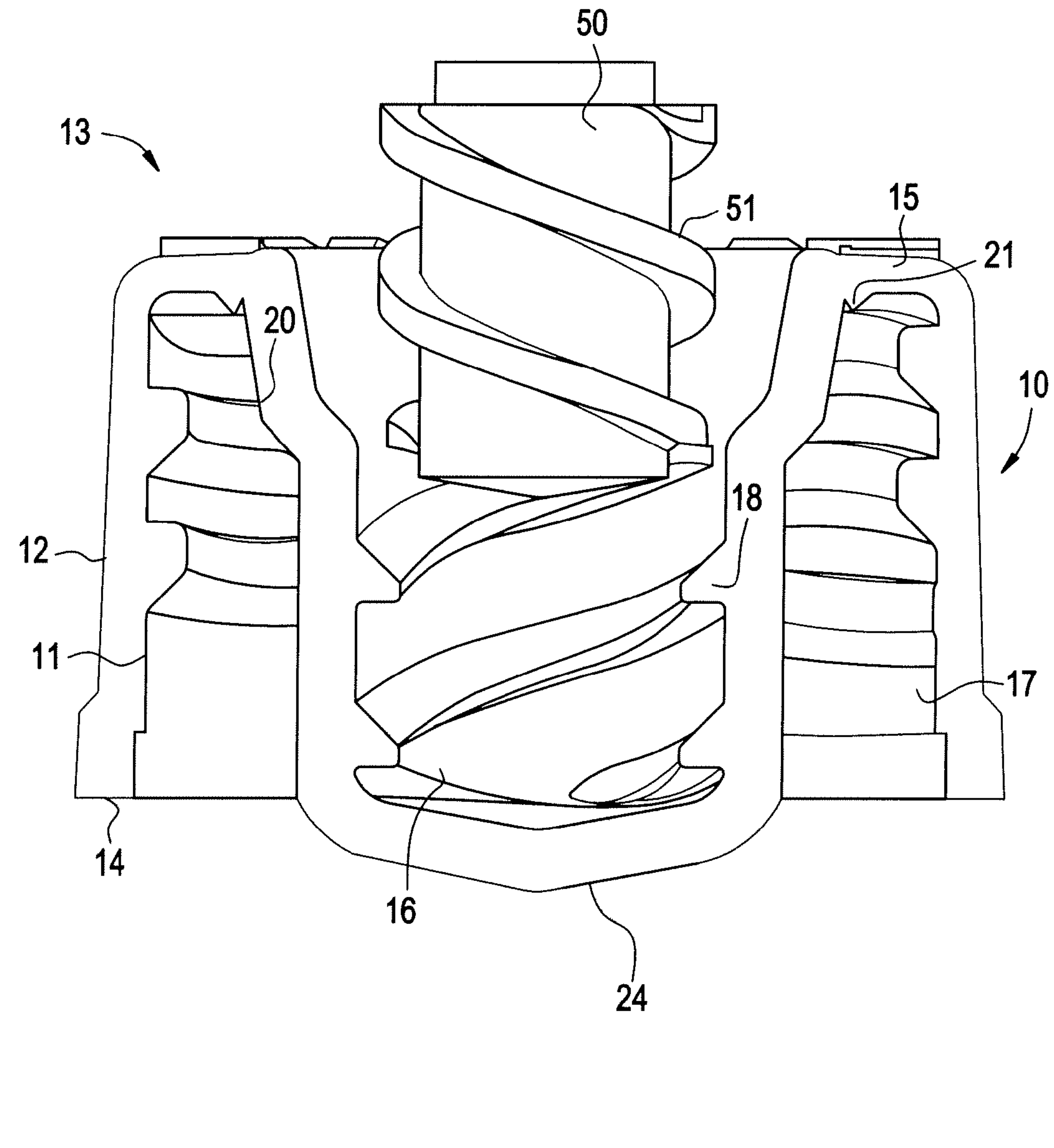
FIGS. 1A and 1B show sectional views of a closure and threaded spindle according to two embodiments of the present invention.
Figure 1B:
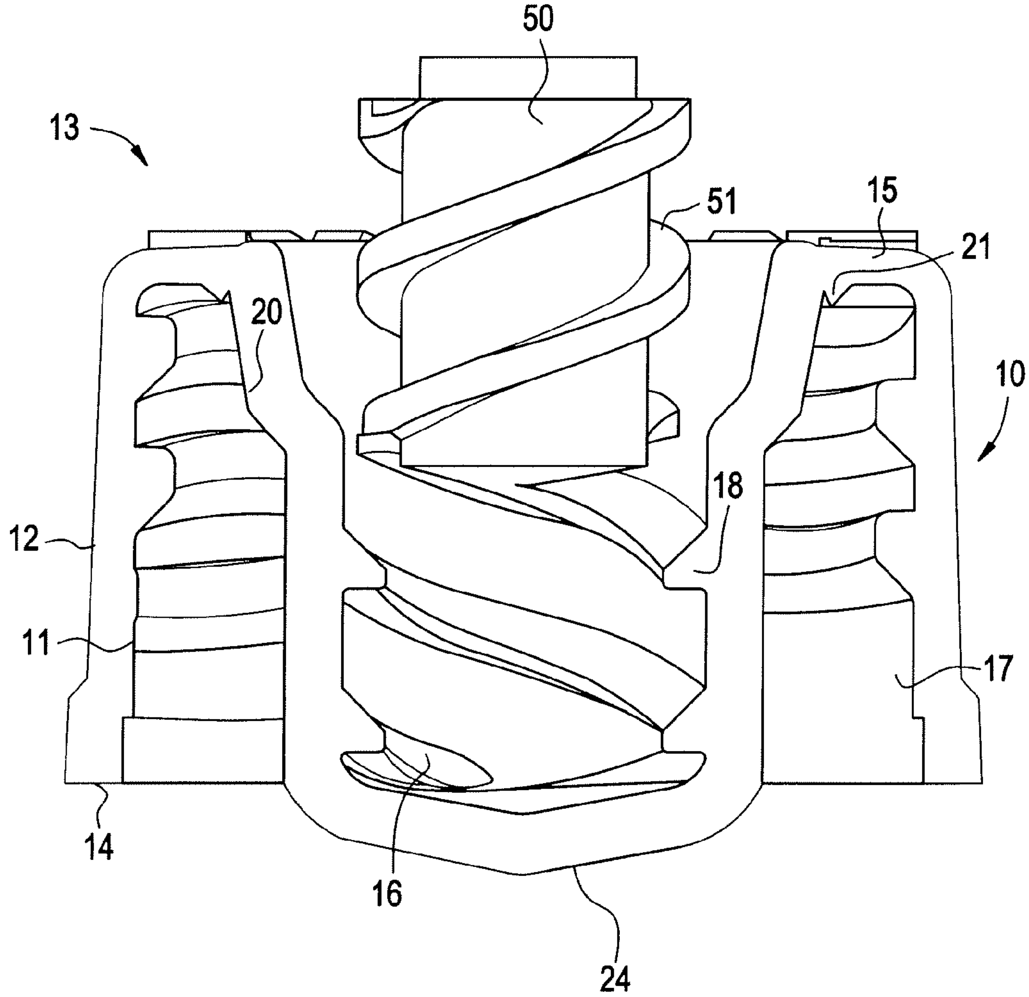

In a preferred embodiment, the cylindrical wall of the closure has threads on the inner cylindrical wall or external cylindrical wall to thread onto corresponding threads of the container. Preferably, the threads are located on the inner cylindrical wall of the cap. That is, the cap is internally threaded. The threads of the on the inner or outer cylindrical wall of the cap are in an opposite direction to those of the threads in the recess or depression. Preferably, the cylindrical wall threads are "right hand" threaded and the threads or the recess or depression are so-called "left hand" threaded as shown in FIG. 1A. The opposite is shown in FIG. 1B. As described below, this allows the threaded spindle to remove the cap simply by screwing into the recess of the cap.

A portion of the cap, preferably the top of the cap has ramp-shaped protrusions, or ratchet teeth, which preferably form a radial pattern around the recess. The protrusions are preferably integrally molded with the cap. As described more fully below, the protrusions interact with elements on a clutch to apply a rotational force or torque to the cap.

The container, also called bottle, according to the present invention is preferably plastic and is adapted for holding a liquid, such as a reagent for an analyzer or other fluent material, such as a powder. The container has an opening at one end and adapted to receive the closure. As noted above, in a preferred embodiment threads are located in the vicinity of the opening which are complementary to the threads on the inner or outer wall of the closure. Preferably the threads on the container are external threads and the threads on the closure are internal (as shown in the figures below).

In a preferred embodiment, the container is a set of two cylindrical containers connected by a rib to prevent rotation of the containers when the closures are being removed. One of the containers has narrower diameter than the other container and is further tapered to a tip at the bottom. This preferred embodiment is described more fully below in connection with FIG. 6.

In a preferred embodiment, the closure, or cap, screws on to the plastic reagent bottle with standard, right-hand threads. On the top of the cap is the recessed area or depression, which is cylindrical and concentric with the outside diameter of the cap. The internal portion of this cylindrical recess has left-hand threads. The bottom of the recess is closed. The bottle preferably containing a reagent will be provided to the user with this cap installed. The user simply loads the bottle, with cap still in place, into the supply area, such as reagent supply of a clinical analyzer. When the fluent material contained in the bottle is needed, the reagent supply will position the bottle below an apparatus for removing and installing a closure.

Another aspect of the invention provides an apparatus for removing and installing a closure on a container, such as those described above. The apparatus includes a threaded rotatable spindle or shaft, which in a preferred embodiment is vertically arranged. The shaft is designed to be threaded into the recess of depression of the closure as described above. In a preferred embodiment, the shaft or spindle has a left handed thread. This is particularly preferable since most conventional bottles and caps have right handed threads. By using a reverse thread on the spindle, upon a removal operation, the spindle will rotate in a direction that screws the spindle into the recess or depression of the cap. When the spindle "bottoms out" against the bottom (or second end wall) of the closure, due to the reverse threaded design, the cap will begin to unscrew from the bottle.

A significant feature of the invention is the "coarseness" of the threaded spindle and corresponding threads in the recess. By selecting coarse threads for both spindle and recess, it is possible to engage the spindle and recess without the requirement of precise alignment between the spindle and cap. That is, the spindle and cap can be slightly off-center from one another and still successfully screw into each other. As used herein, "coarse" is defined as a screw having a pitch of 5 to 10 mm, preferably 7.5 mm. Preferably, the coarse screw is 7.6 mm in diameter and has a dual lead 5-10 mm pitch, preferably 7.5 mm pitch modified Acme thread. As further described below, the coarseness of threads, along with other features of the invention allow a certain amount of imprecision in the alignment of the threaded spindle and closure. The coarseness of the threads makes cross threading between the closure and spindle less likely.

Another feature of the apparatus for removing and installing the closure includes the clutch. The clutch is simply a device that works with the threaded spindle to provide the function of controlling the rotation of the cap with the spindle and to provide a preset or predetermined torque to the cap.

The clutch rotates with the spindle. That is, there is restriction on the rotation of the clutch relative to the spindle. This can be due to, e.g., the presence of splines on that part of the spindle shaft above the threaded section. Alternatively, the shaft can be a square shaft. Any design that restrains rotational movement of the shaft relative to the clutch can be used according to the present invention. In a preferred embodiment, the clutch can move relative to the spindle along the vertical axis of the shaft. The clutch can be biased downwards toward the threaded end of the spindle, and is preferably spring loaded downward. In one embodiment, the clutch is a cylinder that surrounds the shaft/spindle.

As noted above, the function of the clutch is to control rotation of the closure relative to the threaded spindle and provide a rotational force or torque to the closure. Any engagement of the clutch with the closure that achieves this function can be used. In a preferred embodiment, the portion of the clutch that faces the closure has ramps, or ratchet teeth, that engage complimentary teeth or ramp-shaped protrusions on the cap, when the spindle is engaged, preferably fully seated, in the recess of the cap. As noted above, a purpose of the clutch is to lock the spindle and cap together rotationally to prevent the cap from becoming accidentally disengaged from the spindle. The other purpose of the clutch is to control the tightening torque when the cap is replaced on the bottle. This control is achieved through a combination of the downward spring pressure on the clutch, the angle of the ramps on the cap and clutch and the frictional characteristics of the cap and clutch. Depending on the design, the clutch is designed to slip with respect to the closure upon a predetermined torque. In a preferred embodiment, the clutch is made of a hard plastic, such as nylon.

In a preferred embodiment, the shaft of the spindle is attached to the driving mechanism and is unattached at the threaded end of the spindle. This allows the spindle to pivot, such that the threaded end of the spindle can move transversely with respect to the closure. This feature combined with the coarseness of the threaded spindle allows some imprecision between the alignment of the threaded spindle and the closure. In a preferred embodiment, the threaded spindle can be offset up to 5 mm from the closure and there will still be successful engagement of the closure and spindle due to the pivoting of the spindle and the coarseness of the threads. More preferably, the offset can be up to 2 mm.

As noted above, the closure, container and apparatus for removing and installing the closure can be used on clinical analyzer. Such analyzers are described, for example, in U.S. Patent Application No. 2003/0022380. Typical subsystems on such analyzers include, for example, a metering system that includes a probe for metering reagent and/or sample. A sample element supply for supplying sample elements, such as dry slides or reagent cups is also provided. A reagent supply typically includes multiple capped reagent containers, depending on the analysis to be performed. In the present invention, the reagent supply includes the closure, container and apparatus for removing and installing the closure. The analyzer also includes a measuring device such as a reflectometer, spectrometer, fluorimeter, potentiometer for measuring a signal generating by the sample being analyzed. In a preferred embodiment, an incubator is also provided for incubating samples at the proper conditions, such as humidity and temperature. Other systems on the analyzer can include wash systems that may or may not use the same metering probes for the sample/reagents.

The present invention also includes methods for removing and installing the closure on a corresponding container. Broadly all that is required for both the installation and the removal is a closure as described above. The closure does not have to be threaded on the container. Instead, a frictional fit may be sufficient for keeping the closure on the container. In such an instance, all that is required is that the recess or depression on the closure be threaded. In the method for removing, the rotatable threaded spindle is brought into proximity with the threaded depression on the closure. This can be accomplished by lowering the spindle as described more fully below. The threaded spindle is then screwed into the depression for a predetermined distance, generally determined by the spindle bottoming out in the recess. The closure is then rotated when the spindle stops screwing into the closure. In those embodiments, where the closure is not threaded onto the container. The spindle is drawn away from the closure with the cap intact. In those preferred embodiments where the closure is threaded onto the container, the threaded spindle will begin to unscrew the cap from the bottle while remaining engaged with the cap, due to the reverse threads of the spindle and cap/container threads.

In a preferred embodiment, once the cap is removed from the container, the threads of the spindle and threaded recess are of such a coarseness as described above, that under its own weight, the closure would become detached or unscrewed from the threaded spindle. Thus, the elements of the clutch and the ramp-shaped protrusions on the cap are engaged with each other to prevent the cap from being disengaged with the spindle. That is, the cap tends to rotate under its own weight (and optionally the downward bias of the clutch pressing against the top of the cap) in an effort to unscrew from the spindle. This causes the clutch elements and ramp-shaped protrusions on the cap to abut against each other, thus, preventing any further rotation of the cap relative to the spindle. Since the cap is no longer able to rotate relative to the spindle, the cap will not become disengaged from the spindle until the cap is reinserted on the container. The spindle containing the cap can then be moved away from a container allowing access to the contents of the container.

In installing the closure onto a container, the opposite of removing is generally followed. That is, the closure being fixedly held on the threaded spindle as described above is brought into proximity with the opening of the container. If the container and closure are complementarily threaded, the rotating spindle and cap engage the corresponding threads on the container. The cap is then threaded onto the container, under rotational torque provided by the engaged clutch elements and protrusions on the cap. The rotational torque cannot be provided by the spindle, because the direction of the threads on the spindle are such that the direction of rotation tends to cause disengagement of the spindle with the cap. For example, if the spindle and corresponding threaded recess on the cap are left hand threaded and the spindle is being rotated clockwise to install the cap on the container, then the spindle will unthread from the cap as soon as the clutch allows movement of the spindle relative to the cap. This is achieved when the clutch elements slip past the ramp-shaped protrusions of the cap. This can be controlled by design considerations such as the downward bias of the clutch against the cap, the shape of the engaging elements, and hardness of the materials used in the construction of the cap and the clutch.

A preferred method to remove and install a closure is now described. When a bottle, such as a reagent bottle, is positioned below the apparatus, the spindle is lowered into the cap with downward spring pressure. Simultaneously, the spindle is rotated in a counter-clockwise direction. The spindle screws into the cap until it bottoms in the threaded recessed portion of the cap. The spindle continues to rotate in the counter-clockwise direction, unscrewing the cap from the bottle. As the cap unscrews from the bottle, the spindle rises against the downward spring pressure. An optical sensor (described below) detects the rising movement of the spindle and signals the device to raise the spindle away from the bottle. A clutch keeps the cap from disengaging from the spindle as the spindle lifts the cap from the bottle.

The bottle, now uncapped, can be moved to another location for further processing, e.g., in a reagent supply where the reagent is aspirated by a metering system. After aspiration is complete, the reagent supply moves the bottle back to the position of the removal/installation apparatus. The spindle is lowered with downward spring pressure while the spindle is rotated in a clockwise direction. The cap is screwed on to the bottle until the torque reaches the preset clutch torque, at which point the clutch releases. The spindle then unscrews from the cap. The release torque of the clutch is designed to ensure the adequate sealing of the reagent bottle. As during the cap removal operation, an optical sensor detects the rise of the spindle as it disengages from the cap, signaling the spindle to be raised away from the capped bottle.

When the spindle unscrews from the cap, or the cap unscrews from the bottle, the spindle moves upward, interrupting the spindle sensor as described above. Software can be employed to recognize and control these responses during expected or predetermined timing windows to indicate successful completion of removal or installation operations. When the spindle sensor is not interrupted during the expected timing window, software can be implemented to interpret these responses as an error condition. Examples of error conditions are, bottle with missing cap, attempting to place a cap on a capped bottle or a cap that has fallen off of the spindle. Thus, the invention provides detection of all conditions needed for secure initialization and operation of the apparatus.

When the bottle or container is used to store a reagent and is used in a reagent supply in an analyzer as described below, a much lower cap tightening torque is sufficient for the following reasons. First, the interface areas of the bottle cap and neck have become molded to each other due to cold flow of the plastic materials. Second, the bottle will not be subjected to large differential pressure. In order to prevent wear of the cap, bottle and mechanism, it is advantageous to keep the cap tightening torque as low as possible and as repeatable as possible. Therefore, it is advantageous to provide a design that can provide high torque to remove the cap for the first time and a much lower, precise torque to replace the cap. The present invention delivers full spindle torque to remove the cap and a lower torque to tighten the cap. The control of the tightening torque is through selection of clutch/cap protrusion ramp angle, spindle/clutch spring bias and material selection.

The present invention will now be illustrated in connection with the following detailed preferred embodiment described in the drawings. Of course, the preferred embodiment is intended for illustrative purposes only and is not intended to limit the scope of the invention.

FIGS. 1A and B are sectional views of the closure 10 and a partial view of the threaded spindle 50. Also shown in FIGS. 1A and B is inner cylindrical wall 11, outer cylindrical wall 12. The closure also includes a first end 13 (i.e., the top of the cap), second end 14 (i.e., the open bottom of the cap). FIGS. 1A and B also shows first end wall 15. The first end wall 15 includes the recess of depression 16 that is preferably concentric with the cylindrical wall (11, 12) of the cap and extends into the space 17 defined by the cylindrical side walls and top (first end wall 15) of the cap. The depression 16 has threads 18. The threads are complementary with the threads 51 on spindle 50. Counter-clockwise rotation of the spindle causes spindle to thread into cap. When the spindle 50 bottoms out against second end wall 24 (i.e., the bottom of the recess), full spindle drive torque is applied to the cap, unscrewing it from bottle. FIGS. 1A and B also show crush rib 21 and plug seal 20 that are redundant seals that engage with the bottle when the cap is screwed into place. The redundant nature of the crush rib and plug seal ensure secure sealing during reagent sealing. During the reagent manufacturing process, it is necessary to tighten the cap to a high torque because, shipping by air subjects the reagent bottle to high differential pressure. As is standard in cap designs for high pressure, the cap has redundant seals as described above. The plug seal 20 provides an interference fit with the bottle neck and actually expands the bottle neck as the cap is tightened. Additionally, the crush rib 21 is provided, which is deformed when the cap is fully tightened, giving extra pressure resistance. Because of the high sealing torque, high torque is required to remove the cap for the first time.

Figure 2:
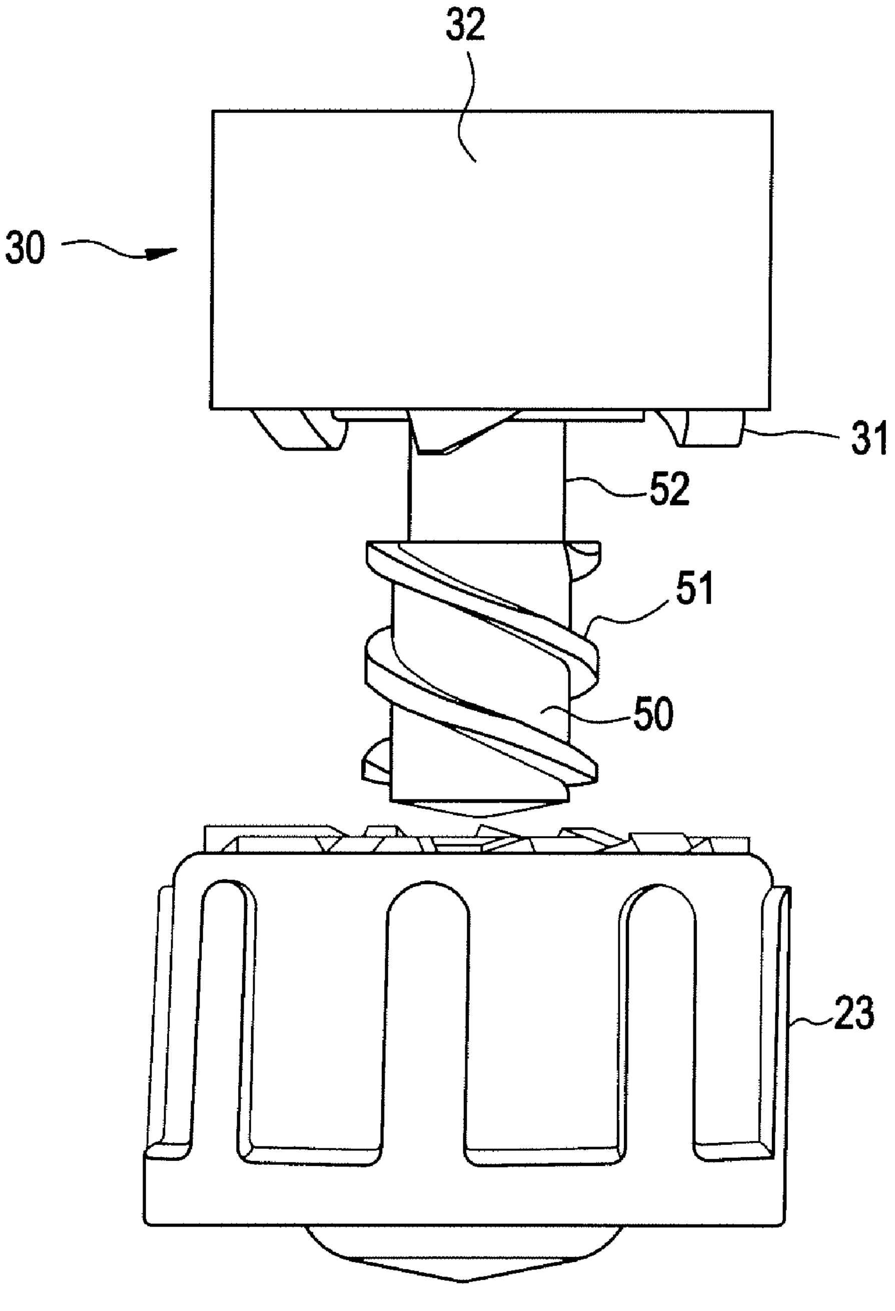
FIG. 2 shows an elevation view of a closure, threaded spindle and clutch according to one embodiment of the present invention.

As best shown in FIG. 2, the engagement of the clutch 30 to the spindle is through a square shaft 52, which allows the clutch to move vertically relative to the spindle, but also to be constrained rotationally. While FIG. 2 shows the engagement of the clutch to the spindle through a square shaft, other designs such as splines on a cylindrical shaft that control rotation of the clutch with respect to the spindle are also within the scope of the invention. The clutch includes sleeve 32 and biasing springs 33 (FIG. 4). The clutch includes elements 31 that engage with ramp-shaped protrusions 22 (FIG. 3) to hold the cap in place on the spindle and provide the rotational torque when installing the cap on the container. The clutch elements 31 have an asymmetrical shape (i.e., truncated ramp-shaped triangle) (see also FIG. 3) that allow the elements to engage with low torque during cap removal (thus reducing wear and ensure full spindle engagement in cap) and disengage at higher torque during cap replacement. During cap replacement, it is the ramp angle ⊖ (31*a*) of the clutch element and protrusions of the cap along with the clutch/spindle spring tension that determines the cap tightening torque as described above. The outer cylindrical wall also includes a plurality of vertically extending ridges 23.

Figure 3:
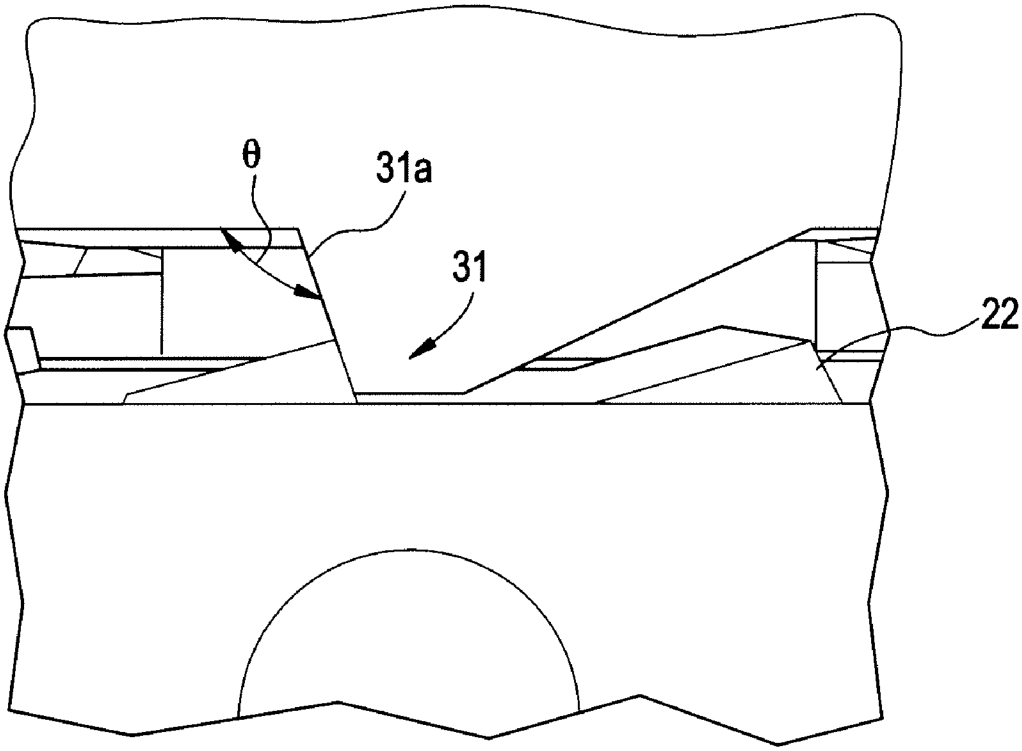
FIG. 3 shows an expanded elevation view of the closure, threaded spindle and clutch engaged according to one embodiment of the present invention.
Figure 4:
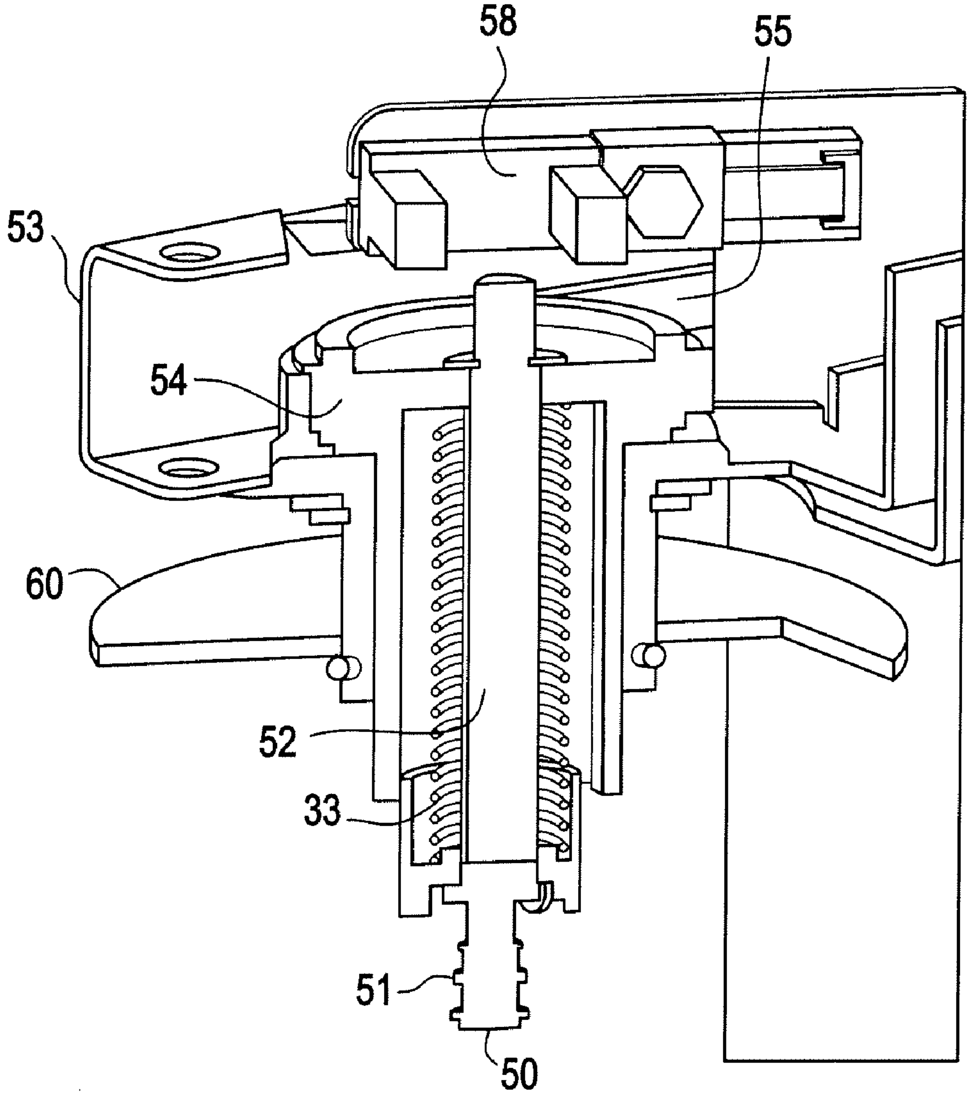
FIG. 4 shows a sectional view of an apparatus for removing and installing a closure according to one embodiment of the present invention.

FIG. 3 shows a close view of the clutch and spindle engaged with the top of the cap. In particular, the protrusions 22 of the cap are shown abutting the elements 31 of the clutch and the angle 31*a* of the clutch elements.

FIG. 4 shows a sectional view of an apparatus for removing and installing a closure according to one embodiment of the present invention. In a preferred embodiment, the apparatus includes a carriage 53 for mounting the clutch/spindle and other optional components of the apparatus. The carriage 53 is driven by a radial drive motor (not shown) and vertical drive motor (not shown), which allows for vertical and horizontal movement of the spindle and clutch combination. Movement of the carriage is controlled by radial and vertical sensors (both not shown in the figures). Spindle sensor 58 detects vertical movement of spindle to determine when the closure has been removed and installed on the container. A preferred embodiment of the apparatus also includes spindle drive pulley 54 and belt 55. In the embodiment of FIG. 4, the pulley engages the spindle through a square shaft 52 allowing the spindle to move vertically relative to the pulley, but also to be constrained rotationally. That is, the pulley 54 provides rotational movement to the shaft/spindle/clutch arrangement while allowing vertical movement to the spindle/clutch. Furthermore, in a preferred embodiment, the pulley engages the spindle shaft only at the top end of the pulley. There is clearance between the pulley and spindle shaft at the lower part of the pulley, permitting the spindle shaft to pivot with respect to the axis of the pulley. As described above, it is this pivoting or "universal joint" feature along with the coarseness of the threads that allows the spindle to thread into the cap even when the axes of the spindle and cap are not precisely aligned. A preferred embodiment shows a sealing disk 60 to cover the opening in the reagent supply cover of a clinical analyzer partially shown in FIG. 5.

Figure 5:
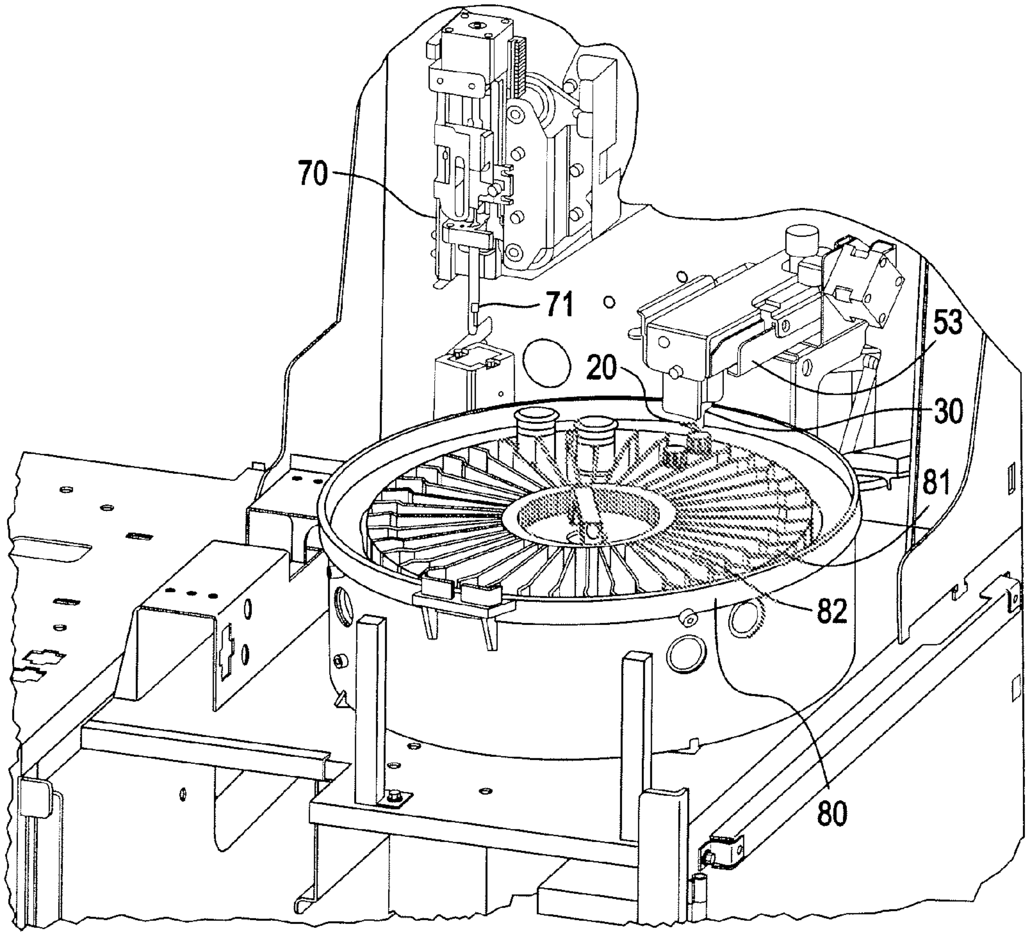
FIG. 5 shows a cutaway perspective view of a clinical analyzer showing the metering probe and apparatus for removing and installing a closure on a reagent container according to one embodiment of the invention.

FIG. 5 shows a partial cutaway of a preferred embodiment where the closure removal/installation apparatus is shown with the reagent supply and metering system of a clinical analyzer. As FIG. 5 shows, a metering system 70 includes probe 71 for aspirating and dispensing a liquid. Such metering systems are well known in the art and do not need further description. A reagent supply 80 is also shown. The reagent supply will also include a cover (not shown) to maintain the reagents at a desired temperature and/or humidity if desired. In the embodiment shown in FIG. 5, the reagent supply has a slot that includes inner 81 and outer 82 locations for reagent bottles. The closure removal apparatus can move the spindle in a radial direction to align with the selected bottle (inner or outer) and in the vertical direction to clear the reagent supply rotor 83.

Figure 6:
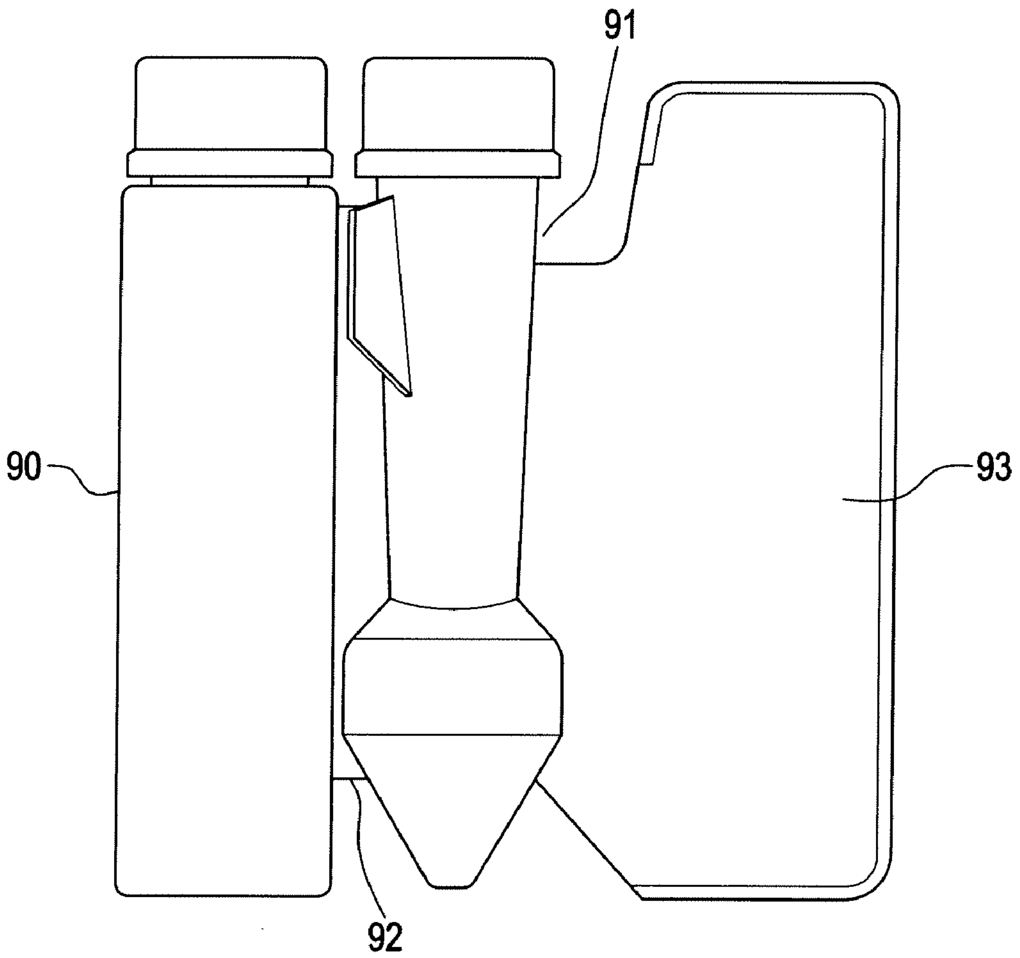
FIG. 6 shows an elevation view of the combination container and closure according to the present invention.

FIG. 6 shows a preferred bottle configuration for the reagent supply of the present invention. The bottles include an outer bottle 90 (in the radial direction of the reagent supply rotor 83) and an inner bottle 91. In a preferred embodiment to prevent rotation of the bottle during the cap removal/installation procedure, the bottles are connected by webbing 92. For ease in handling and installation, the fused bottle combination can include fin 93. The inner bottle is preferably a narrower diameter than the outer bottle and is tapered to a point at the bottom. However, the relative sizes and shapes of the bottles are dictated by the reagent volume needs of a particular assay. There are several bottle styles available for performing assays.

In previous designs evaporation from reagents was controlled by providing the reagent supply with an internal humidity source and by maintaining the reagent supply temperature colder than was necessary for preserving reagent. The internal humidity source required additional maintenance by the end user and additional hardware and sensing in the system. In contrast, in the present invention where the apparatus is used with an analyzer, the inventors found that evaporation was controlled by storing reagent bottles with pressure-tight caps, and the need for internal moisture source and control and lower temperatures is reduced or even eliminated. Maintaining the reagent supply at a higher temperature reduces stress on the thermal control system and reduces condensation. More importantly, the higher reagent supply temperature allows faster reagent warm-up during assay processing, improving assay performance. The pressure-tight cap of the present invention vs. open reagent bottle will also extend reagent storage life.

The present invention also allows the same low cost cap that is used to ship the reagent to the end user to be utilized during storage in the analyzer without any additional operator intervention. This is obviously a benefit for the end user in terms of both convenience and cost.

In a preferred embodiment, the methods described above can be implemented by a computer program interfacing with a computer, that can include a computer usable medium having computer readable program code configured to conduct the methods.

It will be apparent to those skilled in the art that various modifications and variations can be made to the compounds, compositions and processes of this invention. Thus, it is intended that the present invention cover such modifications and variations, provided they come within the scope of the appended claims and their equivalents.

The disclosure of all publications cited above are expressly incorporated herein by reference in their entireties to the same extent as if each were incorporated by reference individually.

I claim:

1. A system comprising:

(i) a closure for a container comprising:

an inner cylindrical wall having first and second ends and defining a space;

an outer cylindrical wall opposite the inner cylindrical wall having said first and second ends to form an outer surface of the closure;

a first end wall extending across said first end, wherein said first end wall comprises a recess extending at least partially into said space, and a first set of threads disposed on said recess having a right hand direction or a left hand direction; and a second set of threads disposed on said inner or outer cylindrical wall having a left hand direction or right hand direction which is opposite that of the first set of threads;

(ii) a container having an opening at one end adapted to receive the closure; and (iii) an apparatus for removing and installing the closure on the container comprising:

a threaded rotatable spindle adapted for threading into the closure having the recess with the first set of threads disposed thereon and for applying a rotational force to remove the closure; and a clutch which rotates with the spindle having an element adapted to engage the closure and apply a rotational force to the closure.

2. A system as claimed in claim 1, wherein the threads on the spindle are coarse.

3. A system as claimed in claim 1, wherein the spindle further comprises a shaft portion and the clutch further comprises a sleeve surrounding the at least a portion of the shaft portion, whereby the clutch is translatable in a direction along the axis of the spindle, but is stationary relative to the spindle in the direction of rotation.

4. A system as claimed in claim 3, wherein the shaft is square or has splines.

5. A system as claimed in claim 3, further comprising a spring for biasing the clutch in a direction of the threaded spindle to engage the closure and for apply an axial force to the closure.

6. A system as claimed in claim 3, wherein the element adapted to engage the closure and apply a rotational force to the closure is located on the end of the sleeve substantially perpendicular to the spindle.

7. A system as claimed in claim 6, wherein the element comprises a plurality of protrusions arranged along the radial perimeter of the end of the sleeve extending in a direction toward the spindle and adapted to engage corresponding ramp-shaped protrusions on the closure.

8. A system as claimed in claim 7, wherein a cross-section of the protrusions is in the shape of a ramp-shaped triangle having a flat top surface.

9. A system as claimed in claim 8, further comprising a carriage for holding and transporting the spindle and clutch and a motor for rotating the spindle and clutch.

10. A system as claimed in claim 9, wherein the motor is mounted in the carriage and further comprising a drive pulley on the spindle and a belt to connect the drive pulley with the motor.

11. A system as claimed in claim 9, further comprising a radial drive motor for moving the carriage in a horizontal position from a position over the closure to a position away from the closure.

12. A system as claimed in claim 7, further comprising a vertical drive motor for moving the carriage in a vertical direction.

13. A system as claimed in claim 7, further comprising sensors for detecting a vertical and radial position of the spindle.

14. A system as claimed in claim 1, wherein the threads on the spindle and the recess with the first set of threads disposed thereon are coarse.

15. A system as claimed in claim 14, wherein the weight of the closure causes the spindle and closure to become unscrewed without the element on the clutch engaging the closure to prevent rotation of the closure relative to the spindle.

16. A system as claimed in claim 1, wherein said first set of threads have a left hand direction, and said second set of threads have a right hand direction.

17. A system as claimed in claim 16, wherein the closure comprises a plurality of ramp-shaped protrusions which extend in a direction away from the closure.

18. A system as claimed in claim 16, wherein a portion of the end wall surrounds the recess and comprises a plurality of ramp-shaped protrusions arranged along the radial perimeter of the end wall and extend in a direction away from the second end.

19. A system as claimed in claim 18, wherein the ramp-shaped protrusions are adapted to engage corresponding elements on the element.

20. A system as claimed in claim 1, wherein said second set of threads is disposed on said inner cylindrical wall and said outer cylindrical wall comprises a plurality of vertically extending ridges.

21. A system as claimed in claim 1, wherein the recess comprises a second end wall disposed opposite the first end wall.

22. A system as claimed in claim 21, wherein the recess is adapted to receive the threaded spindle and the second wall arrests the downward movement of the threaded spindle.

23. A system as claimed in claim 1, further comprising a plug seal located between said recess and outer cylindrical wall adapted to frictionally engage the container being sealed.

24. A system as claimed in claim 1, further comprising a crush rib located at the first end wall and adapted to be biased against a container when the closure is on the container to provide a sealing effect.

25. A system as claimed in claim 1, wherein container has an opening at one end adopted to receive the closure, wherein at least the opening of the container is cylindrical and has threads disposed in the vicinity of the opening adapted to receive the second set of threads.

26. A system as claimed in claim 25, wherein the threads are disposed on the outer surface of the container and the second set of threads are disposed on the inner cylindrical wall.

27. A system as claimed in claim 25, wherein the container comprises two cylindrical containers connected by a rib to prevent rotation of the containers when the closures are being removed.

28. A system as claimed in claim 27, wherein one of the two containers is tapered at the bottom.

29. A system as claimed in claim 26, wherein the threads on the spindle are dual lead.

30. A system as claimed in claim 1, wherein the first set of threads are dual lead threads.

31. An analyzer comprising:

a metering probe capable of dispensing or aspirating a liquid;

an incubator;

a measurement system for measuring a parameter of a sample; and a system according to claim 1.

32. A method for removing a closure on a container comprising:

providing a system according to claim 1 providing the closure arranged on the container;

providing the rotatable threaded spindle bringing the rotatable threaded spindle into proximity with the recess on the first end wall of the closure;

screwing the threaded spindle into the first set of threads on the recess; and moving the threaded spindle having the closure threaded thereon away from the container, thereby removing the closure from the container.

33. A method according to claim 32, wherein the recess comprises a second end wall disposed opposite the first end wall and the threaded spindle is screwed into the depression until it reaches the second end wall.

34. A method according to claim 32, wherein the weight of the closure and the engagement of the threaded spindle with the threaded recess is sufficient to unscrew the closure from the threaded spindle when the closure is not supported on the container, and the method further comprises providing the clutch having the element adapted to engage the closure and apply a rotational force to the closure, and engaging the element with the closure to prevent the spindle from being unscrewed from the closure.

35. A method according to claim 34, wherein a portion of the first end wall that surrounds the recess comprises a plurality of ramp-shaped protrusions arranged along the radial perimeter of the first end wall and extend in a direction away from the second end, and wherein the elements of the clutch and the ramp shaped protrusions abut each other during the engagement of the element with the closure to prevent rotation of the closure relative to the clutch.

36. A method for installing a closure on a container comprising:

providing the system according to claim 1;

providing the rotatable threaded spindle having the closure screwed thereon, wherein the weight of the closure and the engagement of the threaded spindle with the threaded recess is sufficient to unscrew the closure from the threaded spindle when the closure is not supported on the container;

providing the clutch having the element adapted to engage the closure and apply a rotational force to the closure;

engaging the element with the closure to prevent the spindle from being unscrewed from the closure;

moving the threaded spindle having the closure screwed thereon into proximity with an opening on the container; and rotating the spindle and clutch in a direction to unthread the spindle from the closure.

37. A method according to claim 36, wherein at least the opening of the container is cylindrical and has threads disposed in the vicinity of the opening to receive the second set of threads to form a sealing closure, and wherein the rotation of the spindle and clutch and the engagement of the clutch element with the closure provides sufficient rotational force to thread the closure onto the container.

38. A method according to claim 37, wherein a portion of the first end wall that surrounds the recess comprises a plurality of ramp-shaped protrusions arranged along the radial perimeter of the first end wall and extend in a direction away from the second end, and wherein the elements of the clutch and the ramp shaped protrusions abut each other during the engagement of the element with the closure to prevent rotation of the closure relative to the clutch until a predetermined torque is reached, and wherein when the predetermined torque is reached, the clutch and spindle rotate relative to the closure and the spindle become unthreaded from the closure, thereby releasing the closure.

39. A method according to claim 38, further comprising moving the spindle and the clutch away from the closure when the closure is released from the spindle.

* * * * *